United States Patent [19]
Haugseth

[11] Patent Number: 6,137,194
[45] Date of Patent: Oct. 24, 2000

[54] LOW VOLTAGE ELECTRIC MOTOR FOR MOTIVATIONAL TEACHING

[76] Inventor: Lorentz A. Haugseth, 11315 W. Center Ave., Lakewood, Colo. 80226

[21] Appl. No.: 09/024,002

[22] Filed: Feb. 14, 1998

Related U.S. Application Data

[60] Provisional application No. 60/040,750, Mar. 13, 1997.

[51] Int. Cl.$^7$ .............................. H02K 1/00; H02K 5/00; G09B 23/00
[52] U.S. Cl. .............................. 310/1; 434/380; 310/40 R
[58] Field of Search ..................... 310/1, 40 R; 434/224, 434/301, 308, 380

[56] References Cited

U.S. PATENT DOCUMENTS

| | | | |
|---|---|---|---|
| 2,344,438 | 3/1944 | Latour | 310/1 |
| 3,109,946 | 11/1963 | Pontin | 310/1 |
| 3,445,692 | 5/1969 | Kato | 310/42 |
| 3,678,310 | 7/1972 | Munn | 310/40 MM |
| 4,127,785 | 11/1978 | Noguchi | 310/89 |

OTHER PUBLICATIONS

Paul Doherty (Project Director), Article titled: "Stripped Down Motor" (p. 20 & 21) from "Hands on Science" from series titled: "The Exploratorium Science Snackbook", 1992, 28 pages, Library of Congress Q182.3D631992, 507.8'220, ISBNO–943451–33–7, Published San Francisco CA.

Dr. W. Frohlich, Article titled: "#110 The Dipolar and Tripolar Armature" (p. 85 to 93) from "Science fun experiments in ELECTRICS" Instruction and experiment manual, Copyright 1992 by Franckhsche Verlagshandlung Stuttgart, West Germany, 112 pages, Translated from 33rd German edition, published by LOGIX ENTERPRISE LTD, Montreal Canada.

Judith Hann, Readers Digest article titled: "Electric Motors" (p. 171) from book titled: "How Science Works" 1991, 192 pages, Library of Congress ISBNO–89577–382–Published by Durling Kindersley Limited, London England Printed in Singapore.

William Adler Design—Super Mini Labs—Electric Motor Kit—Pamphlet from Kit #2013, 1977, 2 pages—Kit distributed by and pamphlet published by: Educational Design Inc., New York, N.Y.

John Henry (illustration)—World Book Encyclopedia E vol. 6 copyright 1974, Articled "Making an Electric Motor" (p. 136 & 136a), Library of Congress ISBNO–7166–0074–9, Cat. No. 72–95854, Published by Field Enterprise Educational Corp., Chicago Ill. U.S.A.

*Primary Examiner*—Elvin Enad
*Assistant Examiner*—B Mullins

[57] ABSTRACT

A small, low-voltage direct current (DC) motor for use as an educational device for students. The motor is made from simple hardware such as nails, magnets, threaded rods, nuts, washers and common household materials such as wood scraps, paper clips and milk or water containers. The preferred embodiment consists of a motor shaft 1, armature pole pieces 2 comprising nails, commutator segments 3, non-metallic tubing 4, non-metallic washers 5 and 6, metallic washers 7, hot-glue or epoxy filler 8, armature pole nuts 9, magnetic wire 10, commutator compression nuts 11, permanent field magnets 13, brushes 14 and terminal screws 15. In other embodiments, the nail motor can also be used to demonstrate alternating (AC) operation by replacing permanent field magnets with handmade nail- or bolt-electromagnets. The motor can be used to motorize models utilizing materials and instruction from a kit. The motor can also be used to demonstrate electric generator principles in the mill-volt range.

8 Claims, 9 Drawing Sheets

(SECTION C-C)

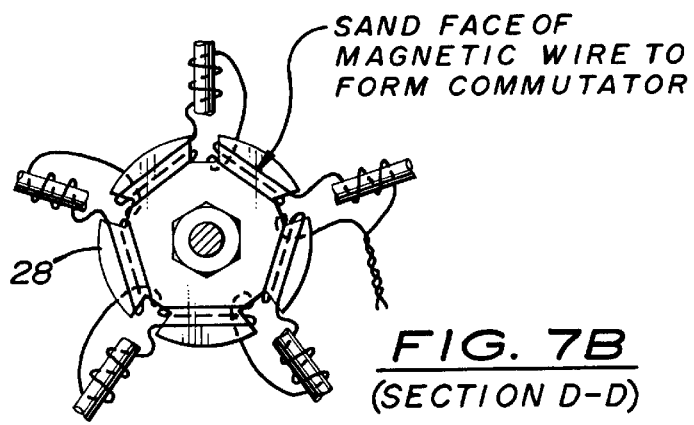
FIG. 7B
(SECTION D-D)
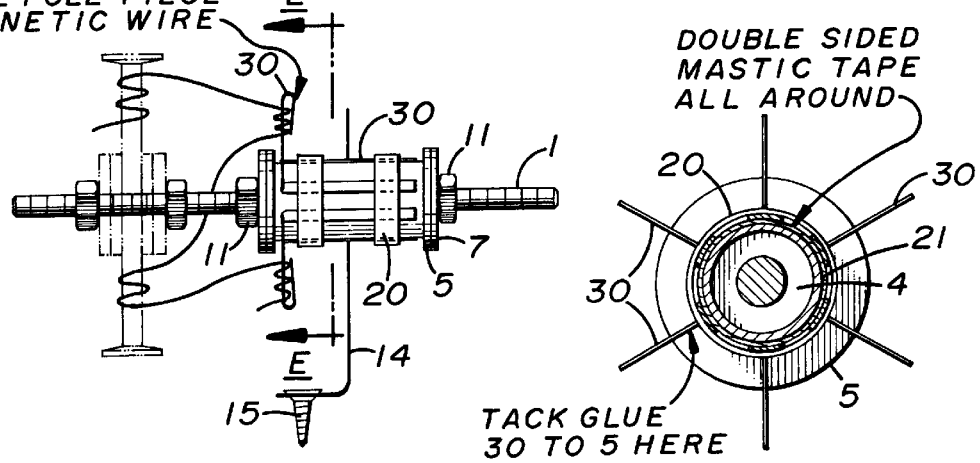
FIG. 8
FIG. 8B
(SECTION E-E)
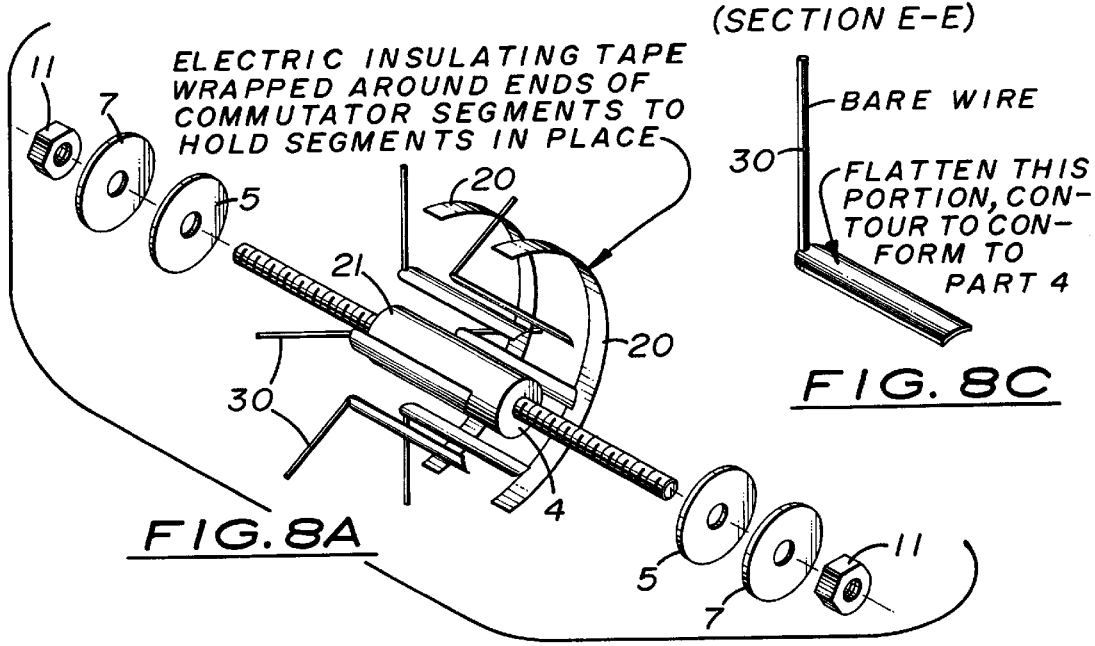
FIG. 8A
FIG. 8C

MOTOR EMBODIMENTS
FIELD MAGNETS

FIELD MAGNETS

ELECTRO MAGNET
AC 3-12 V

LOW VOLTAGE ELECTRIC MOTOR FOR MOTIVATIONAL TEACHING This application is a non-provisional application of U.S. provisional application No. 60/040,750 filed Mar. 13, 1997.

FIELD OF INVENTION

This invention relates to a small, low voltage, direct current (DC), electric motor, and its embodiments designed for construction and assembly by middle and high school students as part of science and after school, hands on, enrichment programs. The motors can also be easily converted to alternating current (AC) operation.

BACKGROUND—DESCRIPTION OF PRIOR ART

Science oriented after school enrichment programs are becoming commonplace in middle schools and high schools of the United States. Educators are realizing the importance of "hands on" activities as opposed to daily academic text book learning exercises involving extensive paper work only. Theoretical studies and computer simulations are no substitute for building and creating things with a persons own two hands. Prefabricated motor kits containing die cast or stamped parts and plastic molded parts are not only prohibitively expensive for most school budgets but introduce higher level manufacturing techniques which are not part of the subject being taught and therefore subtract from the hands on learning experience.

The motor and the motor or embodiments of this invention are made from simple, low technology, hardware store parts such as nails, magnets, threaded rod, tubing, nuts and washers and common household materials such as empty milk cartons and drinking water containers. The only tools required for construction are a hack saw, file, knife, scissors, glue gun, small crescent wrench and hand or electric drill.

The prior art incorporating the concept of total hands on construction of electric motors were simple wire loops in a permanent magnetic field. Usually the wire itself was the motor shaft and the bearings were paper clips taped to the side of Styrofoam cups. Commutation was accomplished by painting a stripe on a bare section of the wire motor shaft itself. The paper clips acted as the motor brushes. These Styrofoam cup DC motors had only one torque impulse per cycle. While these motors provide excellent instructional information on motor principles, they lack sufficient torque to drive science projects. Other variations of this same concept involving coils wrapped around match boxes have also been developed and published, however, these motors also lack sufficient torque to drive science and engineering projects.

The typical embodiment and alternate embodiments of this invention not only cover basic motor principles but the motors themselves can be used to provide power for class room engineering projects such as model race cars, planes, cranes, boats, robots, etc. The motors are completely reversible by simply changing polarity. The typical embodiment and alternate embodiments of this invention also are easily converted to low voltage alternating current (AC) electric motors by replacing the permanent field magnets with simple nail electromagnets and then connecting these field electromagnet wires in parallel with the motor brush terminals. Converting the motors of this invention to (AC) further enhances motor basic principle instruction. The instructional value of the motor of this invention and its embodiments can further be enhanced by rotating them at moderate speed. In this mode, the motors become, milli voltage generators.

Other educational electric motors, such as that shown in U.S. Pat. No. 4,127,785 by Noguchi, are excellent for instruction of motor principles and can be used, with appropriate equipment, to power class room engineering projects. The disadvantage is that this motor incorporates prefabricated parts which subtract from the total hands on creative process. Also parts for the Noguchi motor are not as readily available as are the simple parts of the typical motor and its embodiments of this invention. U.S. Pat. No. 3,678,310 by Munn et al. titled: "Instructional Electric Motor" has the same disadvantages namely premanufactured parts. The "Electric Motors for Toys" under U.S. Pat. No. 3,445,692 by Masao Kato also has the prefabricated parts and therefore the disadvantages as explained above. This motor may not, however, have been designed for motor instructional purposes other than that instruction that occurs from connecting the motor to a power train.

The kit motor by Logix Enterprises in their 1972 book titled "Science fun Experiments in Electricity" also incorporates complex premanufactured motor parts. For example, the armature pole pieces or armature plates are a lamination of special shaped pieces. The commutator consists of three complex shape segments each with a stem extension fitted into segment holders. Commutator segments are held in position by special lugs on the segments which fit into holes located in the segment holder. The field pole pieces are preformed steel bars. The ends of the threaded motor shaft are machined to provide smooth motor shaft extensions for insertion into bearing brackets. The motor by Logix Enterprises is excellent for instructional purposes, however, parts are not readily available at local hardware stores and parts cannot reasonably be made in a class room setting.

Commercially available preassembled small motors can be used for class room engineering projects but the electric motor principle is entirely absent. Also, commercial preassembled motors usually have small diameter, smooth hardened shaft extensions which are difficult to attach anything to. Small commercial motors require hot solder to connect the lead wires. Because of the hazardous nature of most solder and fluxes, particularly in the hands of middle school children, these motors should only be used under strict supervision. The typical embodiment and alternate embodiments of the motor under this invention require no soldering of any kind.

Other kit motors available from hobby stores or mail order houses usually have only three poles on the armature thus limiting their power and starting capability. Such kit motors usually have laminated parts which have been die cut. Also, these motors usually have extrusion molded plastic parts and preformed wrap-around permanent magnets. The armatures of most small commercial preassembled motors also contain only three poles and use the toy motor winding. Worse, the small commercial preassembled motors cannot be disassembled. The high technology used to manufacture either the preassembled commercial motors or the kit motors defeats the purpose of the enrichment programs which is to demonstrate basic electric motor principles and provide "hands on" construction using low technology and readily available materials. Also, these motors are usually prohibitively expensive for most public school budgets.

OBJECTS AND ADVANTAGES

The typical embodiment and alternate embodiments of the educational electric motors of this invention overcome the disadvantages of commercial preassembled motors, commercial kit motors, and prior art inventions by providing:

(a) A low cost, easily constructed educational tool for instruction in electromagnetic motor principles wherein the entire motor, including the armature shaft, armature pole pieces, coils, commutator, brushes, and field magnet installation can be constructed by the student in a ordinary class room setting for a total hands on experience.

(b) In addition to the parts supplied with the kit of this invention, additional motor parts can easily be obtained from any local hardware store or from common materials found around the house. Such parts include nails, threaded rod, nuts, washers, magnets and common household materials such as milk cartons and drinking water containers. No special premanufactured parts are required.

(c) Shafting which allows parts such as pulleys, gears, belts and propellers to be easily attached for powering model robots, race cars, cranes, pumps, blowers, boats and airplanes.

(d) No hot soldering or the use of toxic fluxes required.

(e) Multiple polarity so that motors with armatures containing from 5 to 7 poles can be easily constructed for more power production and easier starting.

(f) Uncomplicated easily made and assembled commutator segments which require no soldering.

(g) Pressure contact commutators which allows for simple connection of armature pole piece wires to commutator segments. Note: One commutator embodiment of this invention requires no commutator segments at all. The armature pole piece wires themselves form commutation tracks.

(h) Logical progression of basic DC motor principles, using hands on motor construction, from typical toy motor winding to real world direct current lap winding.

(i) Easy removal of the coating on the pole piece magnetic wire to make contact with the commutator segments or with the motor brushes of the segmentless commutator of (g) above.

(j) Easy fabrication of parts where extra parts are needed. The only tools required are hack saw, file, scissors, glue gun, small crescent wrench and hand or electric drill.

(k) Simple conversion of DC motor operation to AC operation.

DRAWINGS FIGURES

In the drawings, regardless of the figure, identical parts have the same reference numerals.

FIG. 1B is that the nail armature poles have been replaced by steel tee wedge poles.

Figure 4:
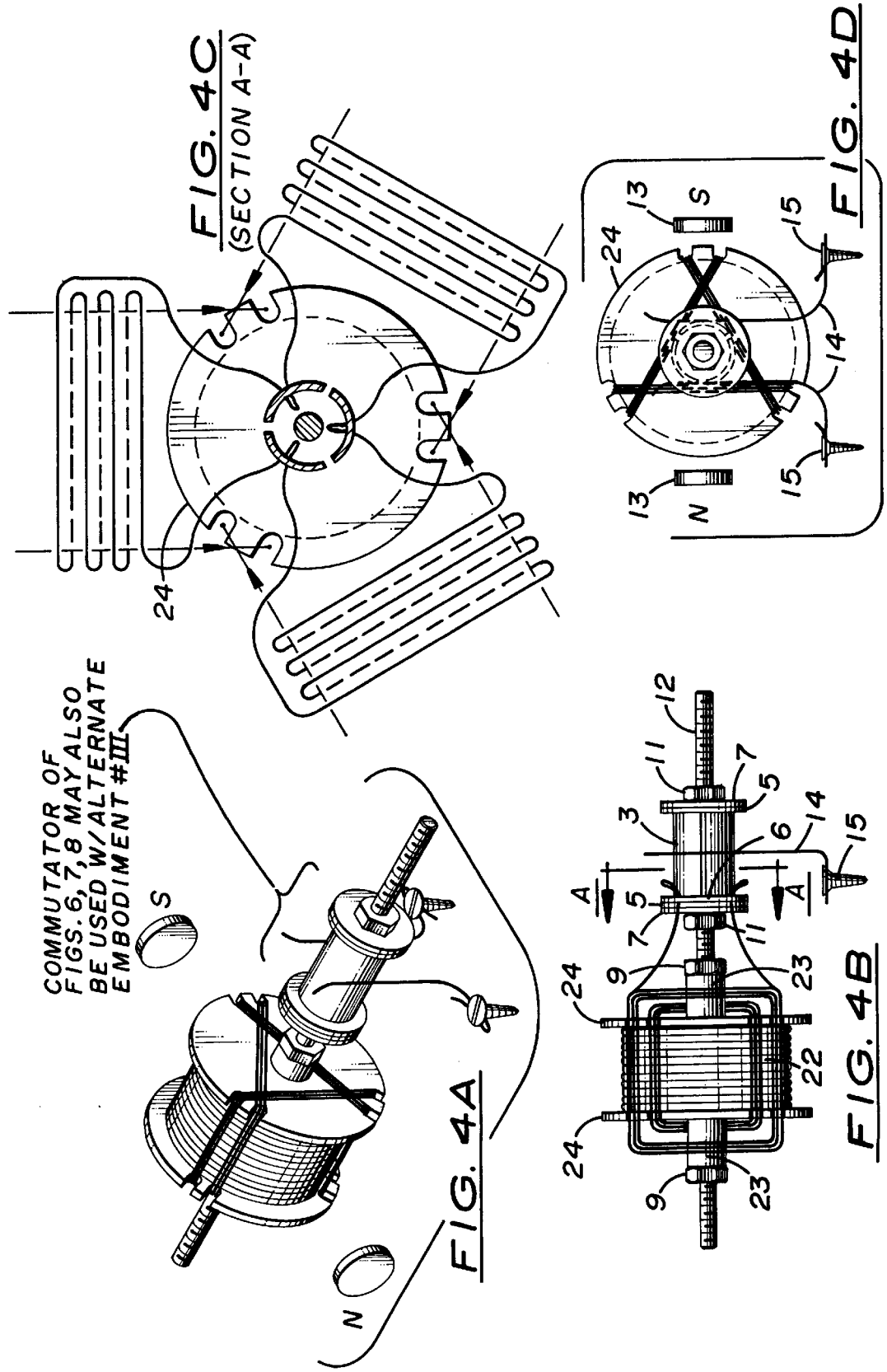
FIG. 4A shows the assembly view of alternate embodiment #III "Multiple Washer—Coil on Cord Electric Motor."

FIG. 4B shows a side view of alternate embodiment #III. Note in FIG. 4B that the nail pole pieces and steel and paper pole washer of FIG. 1B have been replaced by a stack of steel washers and double notched non metallic end plates. Note also that Section A—A of FIG. 4B shows wiring details of the multiple Washer Coil on Cord Electric Motor.

FIG. 4C shows a cross-sectional view of the motor in FIG. 4B along line A.

FIG. 4D shows an end view of the motor in FIG. 4B.

Figure 5:
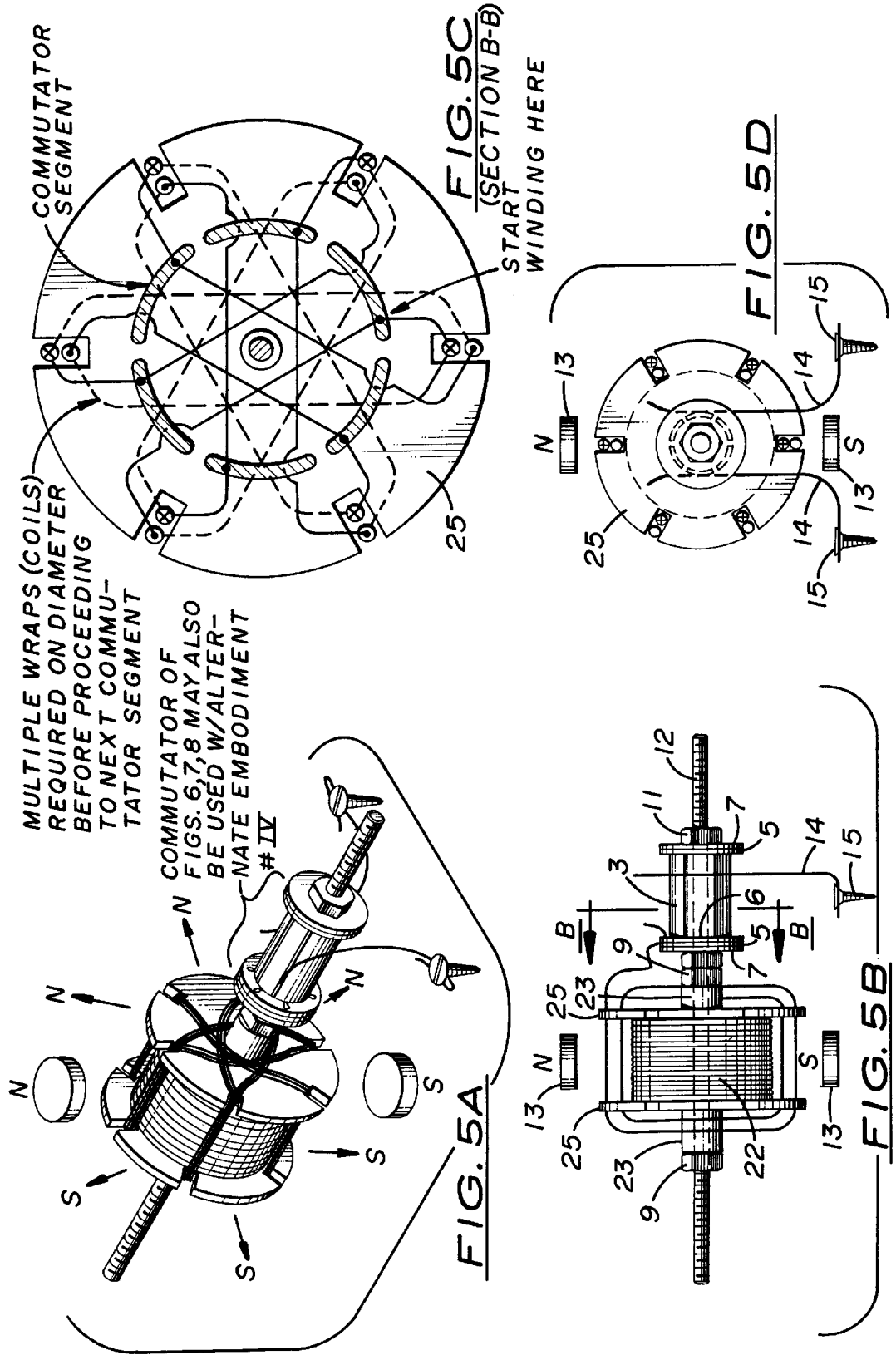

FIG. 5A shows the assembly view of alternate embodiment #IV the "Multiple Washer Lap Wound Armature Electric Motor."

FIG. 5B shows a side view of alternate embodiment #IV. Note in FIG. 5B that the nail armature pole pieces and steel pole washer of FIG. 1B have been replaced by a stack of steel washers and notched non metallic end plates. Note also tgat Section B—B if Fug 5B shows wiring details of the Multiple Washer Lap Wound Armature Electric Motor.

FIG. 5C shows a cross-sectional view of the motor in FIG. 5B along the line B.

FIG. 5D shows an end view of the motor in FIG. 5B.

Figure 6:
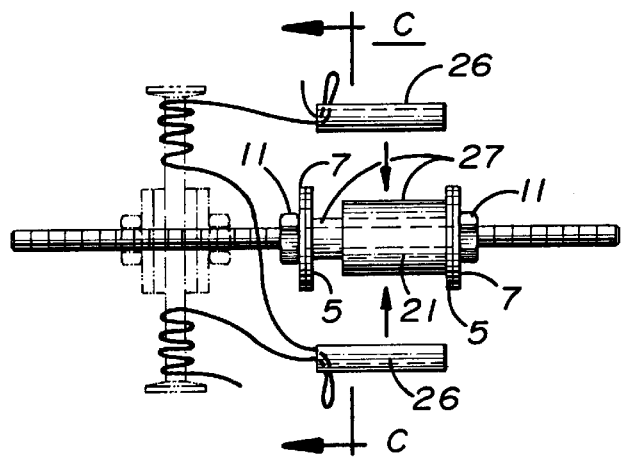

FIG. 6 shows assembly and wiring details of alternate embodiment #V, the "Drilled Segment Pressure Contact Commutator."

Figure 6A:
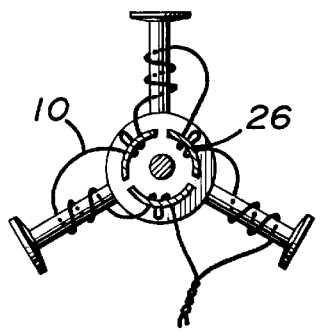
Figure 6B:
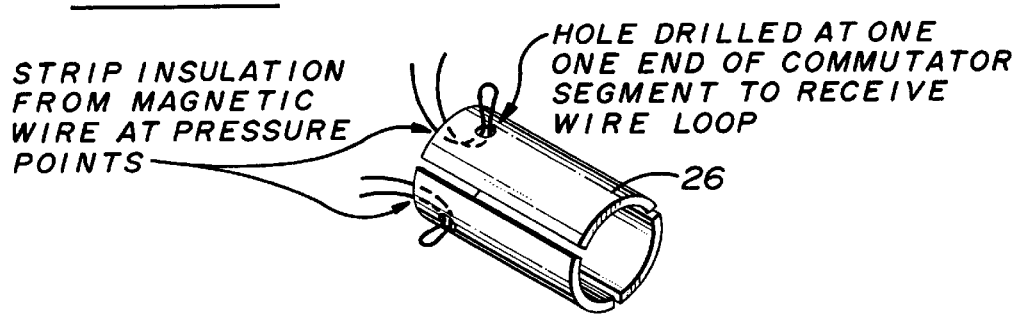

FIG. 6A shows a cross-sectional view of the motor in FIG. 6 along line C. FIG. 6B shows a detail of the commutator used in the motor of FIG. 6.

Figure 7:
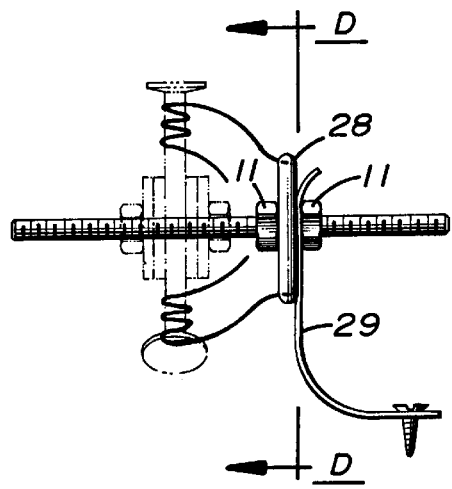

FIG. 7 shows assembly and wiring details of alternate embodiment #VI, the "Wire Wrap Disk Commutator."

Figure 7A:
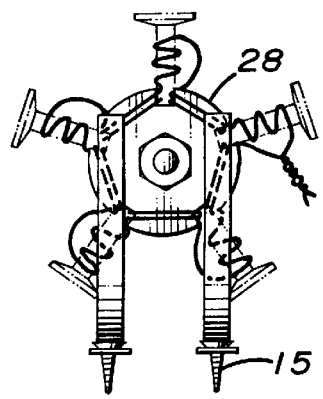

FIG. 7A shows an end view of the motor in FIG. 7.

FIG. 7B shows an enlarged view of the motor of FIG. 7 along line D.

FIG. 8 shows assembly and wiring details of alternate embodiment #VII, the "Flattened Wire Commutator."

FIG. 8A shows an exploded view of the commutator in FIG. 8.

FIG. 8B shows an enlarged view of the motor in FIG. 8 along line E.

FIG. 8C shows a detail of the flattened wire commutator segment used in the motor of FIG. 8.

Figure 9A:
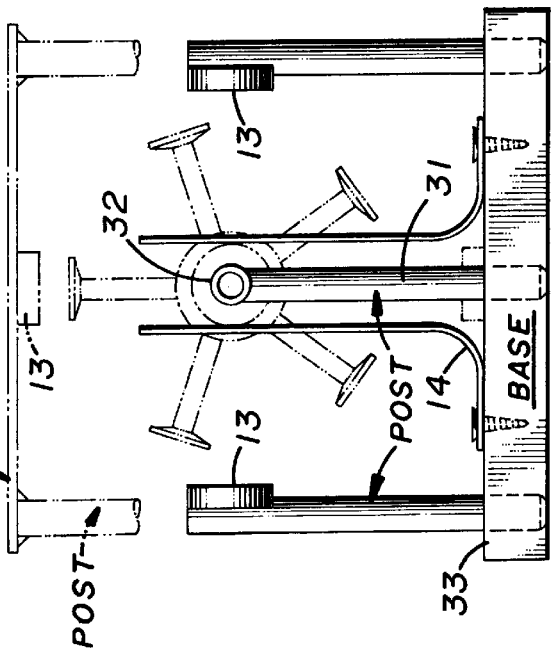
Figure 9:
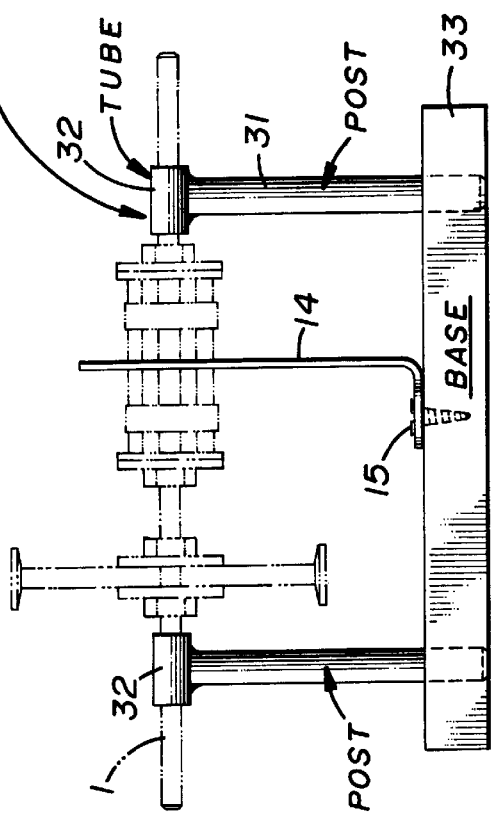

FIG. 9 shows a method for installing motor shaft bearings for all embodiments called "Post and Tube Motor Bearing Installation" The complete motor frame with brushes is also shown.

FIG. 9A shows an end view of the motor in FIG. 9.

FIGS. 10A–F shows various field magnet arrangements can be used with any of the embodiments.

REFERENCE NUMERALS IN DRAWINGS 1 motor shaft—unaltered threaded rod (typical for all embodiment except motor embodiment #I, #III and #IV which require longer shafts)

2 nail pole pieces for armature 3 metallic tube segments for "Cylindrical Segment Pressure Contact Commutator" of the main embodiment 4 non metallic tubing (example compressor hose)

5 non metallic commutator washer (example milk carton)

6 plastic washer with holes for magnetic wire (example drinking water container material usually polyethylene)

7 metallic commutator washer (example steel washer)

7A metallic pole washer (similar to washer 7)

8 filler (example hot glue, glue, epoxy, or plastic filler)

9 armature pole nut 10 magnetic wire 11 commutator compression nut 12 longer motor shaft—threaded rod (for alternate embodiment #I, #III and #IV)

13 field magnet (permanent)

14 brushes (example light weight paper clips or wire)

15 terminal screw 16 tee wedge armature pole piece (example iron or steel)

17 bar magnet (permanent)

18 line drilled fender washer (example iron or steel)

19 short shim tube (example polyethylene tubing)

20 thin insulating electric tape 21 double sided mastic tape—one wrap on part 4

22 iron or steel washer stack 23 stiff non metallic tube spacer (example polyethylene)

24 double notched non metallic end plate (example milk carton material)

25 single notched non metallic end plate (example milk carton material)

26 metallic tube segment for "Drilled Segment Pressure Contact Commutator"

27 insulating electric tape stepped to accommodate magnetic wire and drilled commutator segments 28 non metallic disk commutator notched on rim (example wood)

29 brushes (example thin sheet metal)

30 flattened wire commutator segment 31 post for tubular bearing (example wood, plastic or metal)

32 metallic tube bearing (short length of metallic tubing)

33 Motor base—Non metallic or metallic (example wood)

DESCRIPTION—GENERAL

The typical, or main embodiment of the low voltage electric motor is the "Nail Electric Motor" so named because it uses common nails as pole pieces. FIG. 1A shows the nail electric motor.

Figure 2:
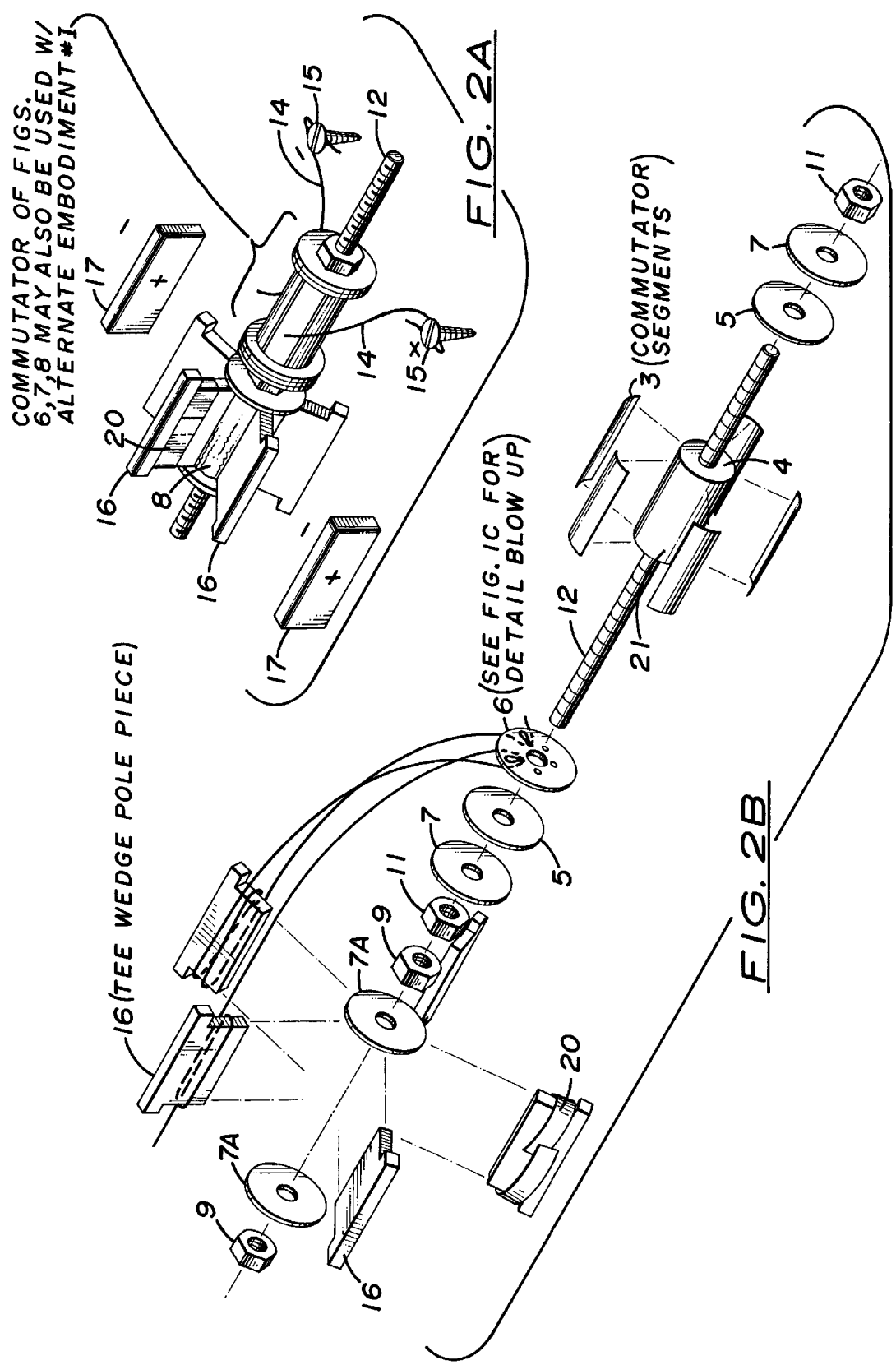
FIG. 2A shows the assembly view of alternate embodiment #I, the "Tee Wedge Electric Motor."
FIG. 2B shows the exploded view of alternate embodiment #I. Note in FIG. 2B that the only difference between FIG. 2B

Four alternative armature pole piece embodiments or armature core embodiments of the nail electric motor are included in this invention. Alternate #I replaces the nail armature pole pieces with tee wedge armature pole pieces. Embodiment #I is therefore referred to as the "Tee Wedge Electric Motor." With the wider armature, alternate #I produces more power as a motor and more power and current as a generator. FIG. 2A shows the tee wedge electric motor.

Figure 3:
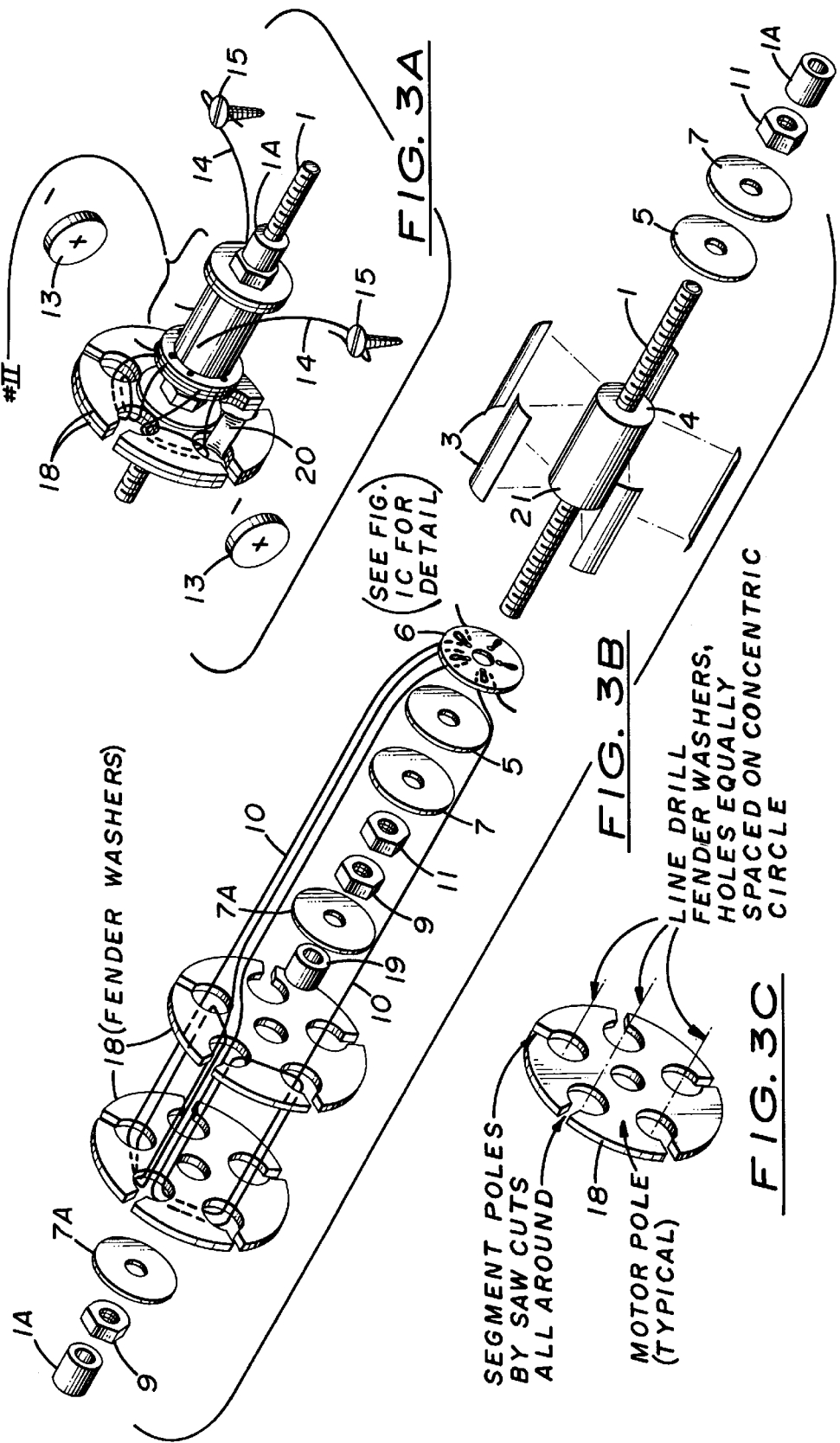
FIG. 3A shows the assembly view of alternate embodiment #II, the "Fender Washer Electric Motor."
FIG. 3B shows the exploded view of alternate embodiment #II. Note in FIG. 3B that the only difference between FIG. 3B and 1B is that the nail armature poles have been replaced by large drilled fender washers.
FIG. 3C shows how a single fender washer is drilled and separated into armature pole pieces.

Alternate #II replaces the nail armature pole pieces of the main embodiment with line drilled fender washer pole pieces. Embodiment #II is therefore referred to as the "Fender Washer Electric Motor." The Fender Washer Electric Motor has the advantage that it randomly distributes the field magnetism throughout the armature rather than concentrating the field magnetism at the pole pieces. The overall effect is a smoother running motor. FIG. 3A shows the fender washer electric motor.

Alternative embodiment #III replaces the armature nail pole pieces and the non metallic and metallic armature pole washers of the main embodiment with a stack of iron or steel washers and double notched non metallic end plates. The motor utilizes a coil on cord winding. The motor is therefore referred to as the "Multiple Washer—Coil on Cord Electric Motor" . This motor is very easy to construct and is ideal for construction at the middle school level. Very little metal cutting is required and the double notches on the heavy paper end plates can be made with an ordinary paper punch. FIG. 4A shows the Coil on Cord electric motor.

Alternative embodiment #IV replaces the armature nail pole pieces and the non metallic and metallic armature pole washers of the main embodiment with a stack of iron or steel washers and single notched non metallic end plates. The motor utilizes the standard lap winding which is used in commercial direct current motors. The motor is therefore referred to as the "Multiple Washer Lap Wound Armature Electric Motor". The motor is designed to teach students the intricacies of real world motor winding construction. Because winding this motor, as shown in FIG. 5B Section B—B, can be confusing, construction of the lap wound motor is reserved for older high-school students.

In FIG. 1A the nail electric motor is shown with what is hereafter referred to as the "Cylindrical Segment Pressure Contact Commutator." Three other commutator configuration are included with this invention. These are the "Drilled Segment Pressure Contact Commutator" (alternate embodiment #V-FIG. 6), the "Wire Wrap Disk Commutator" (alternate embodiment #VI-FIG. 7) and the "Flattened Wire Commutator" (alternate embodiment #VII-FIG. 8). All of these commutator embodiments work equally well with motor armature pole piece embodiments #I, #II, #III and #IV above.

DESCRIPTION—NAIL ELECTRIC MOTOR—
TYPICAL OR MAIN EMBODIMENT (FIGS. 1A
and 1B)

The typical embodiment, (ie. the Nail Electric Motor), is illustrated in FIG. 1A (assembly view) and FIG. 1B (exploded view) the motor base or frame is shown in FIG. 9. The heart of the motor is the armature shown in FIG. 1A and 1B. The motor armature consists of: an unaltered threaded rod motor shaft, part 1; 5to 7 nail armature pole pieces all nails being cut to exactly the same length, part 2; commutator segments, part 3; a piece of non metallic tubing, part 4; non metallic commutator washers, part 5; non metallic pole washers, part 5A (optional); a plastic washer, part 6; metallic commutator washers, part 7; metallic pole washers part, 7A; armature pole nuts, part 9; commutator compression nuts part 11; and double sided mastic tape, part 21.

All armature parts are strung out along the threaded rod as shown in FIG. 1B. The nail armature pole pieces, part 2, are fitted into place between metallic pole washers part 7A or optional non-metallic pole washers part 5A. Initial tacking, with an adhesive such as hot glue, of dimensionally cut nails to one of the pole washers is recommended. Nails are positioned to extend radially outward from the threaded rod (see part 1, FIG. 1B). The nail pole pieces, part 2, are spaced equally apart. Motors are made with 5 or more pole pieces. Odd number of poles are preferred. Nail pole pieces are held firmly in place by being squeezed between pole washers. Armature pole nuts, part 9, apply the necessary tightening pressure. Prior to tightening the pole nuts, part 9, the entire open space between nail pole pieces are filled with hot glue, part 8—FIG. 1A, or other thick adhesive materials such as epoxy in paste form. Before the hot glue or epoxy hardens, the pole nuts, part 9, are tightened firmly.

Figure 1:
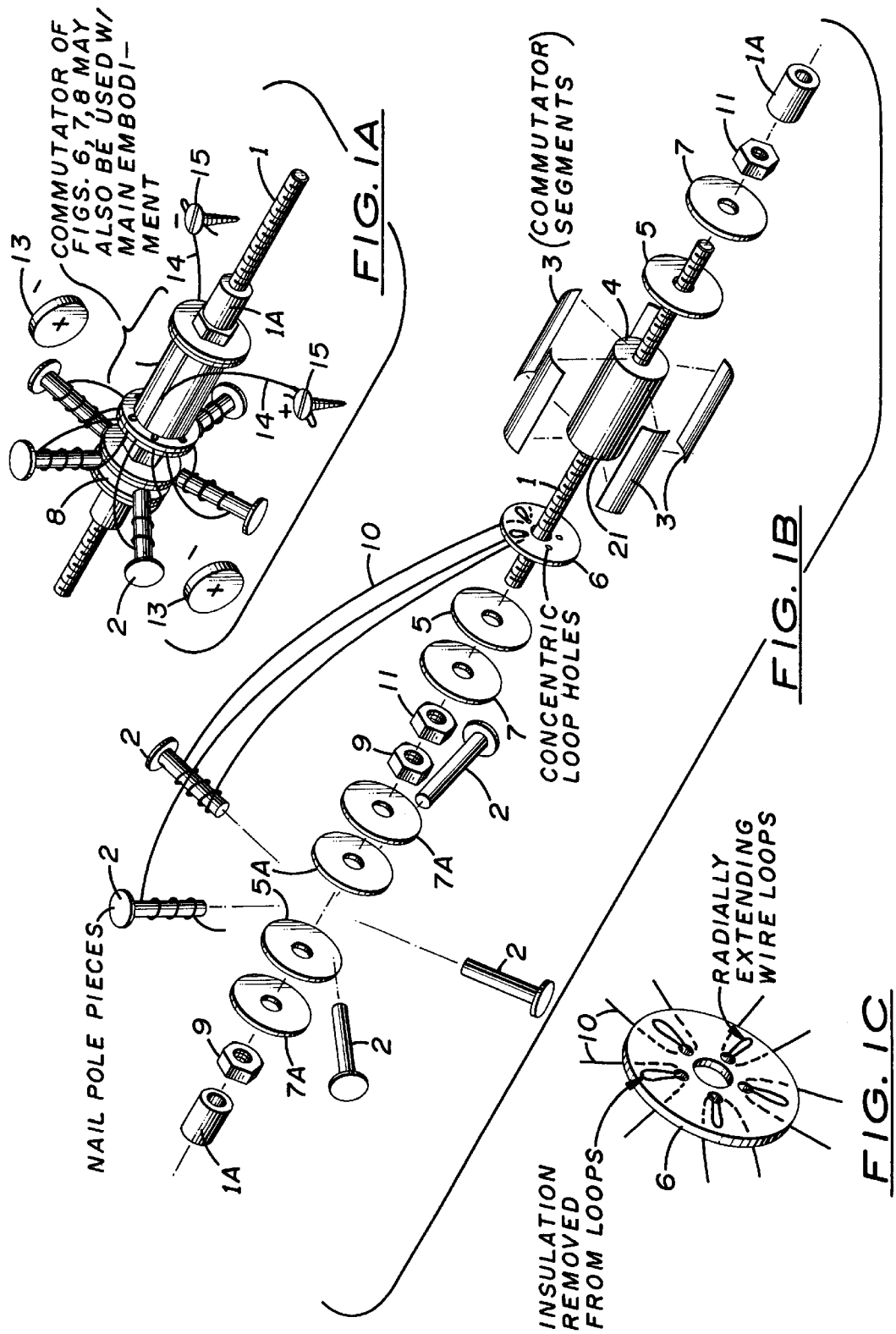
FIG. 1A shows the assembly view of the typical embodiment of the "Nail Electric Motor."
FIG. 1B shows the exploded view of the typical embodiment of the Nail Electric Motor.
FIG. 1C shows, for the main embodiment, a blow up view of the plastic washer which connects the commutator segments to the motor windings.

Each armature pole is wound with magnetic wire (see FIG. 1B). FIG. 1B shows only a few turns on each pole. In practice, many turns of magnetic wire are made on each armature pole FIG. 1 shows the Nail electric motor with a Cylindrical Segment Pressure Contact Commutator. For this commutator, when going from pole to pole with the magnetic wire, the magnetic wire must first pass through the holes in the plastic washer, part 6, of the cylindrical segment pressure contact commutator thus forming radially extending wire loops (see FIG. 1B and 1C). The varnish insulation on the magnetic wire loops is scrapped off the loops after the loops have passed through the holes in the plastic washer. After first wrapping part 4 of FIG. 1B with one wrap of double sided sticky mastic tape, commutator segments, part 3, are placed on the sticky tape and positioned so that the space between segments lines up with the motor poles (see FIG. 1A). Commutator segments, part 3, are held securely in place by the tightening of the commutator compression nuts, part 11. Tightening the commutator compression nuts, part 11, causes the commutator segments and the plastic washer containing the magnetic wire loops to be squeezed between non metallic commutator washers, part 5, and metallic commutator washers, part 7. During tightening of the commutator compression nut, the ends of the metallic commutator segments are forced into the bare wire loops contained in part 6 thus making for very positive electrical contact between commutator segments and the motor winding (see FIG. 1B and 1C). Note, no soldering is required to make this positive electrical contact so that no toxic lead, silver or toxic fluxes are required.

DESCRIPTION—TEE WEDGE ELECTRIC MOTOR—ALTERNATIVE EMBODIMENT #I (FIGS. 2A and 2B)

The construction of the Tee Wedge Electric Motor (alternative embodiment #I—FIG. 2A and 2B), is the same as for the Nail Electric Motor, (typical embodiment, FIG. 1A and 1B), except that the nail armature pole pieces, part 2, are replaced by tee wedges, part 16, as shown in FIG. 2B. Positive electric contact must be made between pole pieces and the Flattened Wire commutator segments as shown in FIG. 8. The tee wedges are manufactured from iron or steel bar using a hack saw and file. The advantage of the Tee Wedge Electric Motor over the Nail Electric Motor is that the Tee Wedge Motor produces more power. Also, more voltage and current are produced when the Tee Wedge Motor is used as a generator. The disadvantage of the Tee Wedge Motor is that it is more difficult to construct and consumes more space in the housing. FIG. 9 shows the motor base or frame for the Tee Wedge electric motor.

DESCRIPTION—FENDER WASHER ELECTRIC MOTOR—ALTERNATE EMBODIMENT #II (FIGS. 3A and 3B)

FIGS. 3A and 3B show the Fender Washer Electric Motor (alternate embodiment #II). The construction of the Fender Washer Electric Motor is basically the same as the Nail Motor and Tee Wedge Motor. Armature pole pieces, for example, are held in place by armature pole nuts, part 9, and armature pole washers, part 7A. The main difference in the Fender Washer Motor over the Nail Motor is that the nail armature pole pieces of the Nail Motor have been replaced by drilled fender washers (see FIGS. 3B and 3C). The need for filler between armature pole pieces has also been eliminated. Note the large holes for motor windings that are bored into the fender washers (see FIG. 3B and 3C). If, for example, a 5 pole piece armature is desired, 5 holes are drilled into the fender washer. Holes are drilled equal distance apart on a concentric circle around the center of the washer. After drilling, slots are sawed through the rim of the fender washer to separate armature poles and provide an opening for inserting the magnetic wire when winding the poles (see FIG. 3C). One or more drilled and pole separated fender washers can be sandwiched together to make up the armature poles of the motor. At least 2 fender washers are recommended for each motor.

Alternate embodiment #II, the Fender Washer Electric Motor, runs smoothly and has a high degree of reliability in self starting and reversing. Fender Washer Motors work well with as few as 3 poles. One explanation for this is that the field magnets, part 13, are not attracted to any particular spot on the motor armature.

DESCRIPTION—MULTIPLE WASHER—COIL ON CORD ELECTRIC MOTOR—ALTERNATE EMBODIMENT #III (FIGS. 4A and 4B)

FIGS. 4A and 4B show the Multiple Washer—Coil on Cord Electric Motor (alternate embodiment #III). The construction of the Multiple Washer—Coil on Cord Motor is basically the same as the Nail Motor and Tee Wedge Motor except that the nail armature pole pieces of the Nail Motor have been replaced by a stack of iron or steel washers bounded by double notched non metalic end plates. The end plates, FIG. 4B part 24, are made from any relatively stiff non metallic material. Waxed milk carton material has been used successfully for the double notched end plates. The purpose of the notches is to position and hold the armature magnetic wire in place. The number of double notches or notch pairs is equal to the number of commutator segments which, in turn is equal to the number of armature pole pieces. For the Multiple Washer Coil on Cord electric motor, three armature poles are recommended. The motor is then wound as shown in FIG. 4C being careful to lay the magnetic wire coils flat along the length of the multiple washer stack. Because this winding places coils on the cord of the multiple washer stack, space is needed at the end of the stack to accommodate overlapping coils. In the design under this invention, this space is provided by a short piece of stiff non metallic tubing shown as part 23 on FIG. 4B. Polyethylene tubing has been used successfully for this spacer. Before winding the armature core, notch pairs are aligned with each other and then notch pairs are aligned with the center point of each commutator segment (see End View and FIG. 4C). The multiple washer stack is then secured by tightening the armature pole nuts part 9.

DESCRIPTION—MULTIPLE WASHER LAP WOUND ARMATURE ELECTRIC MOTOR— ALTERNATE EMBODIMENT #IV (FIGS. 5A and 5B)

FIGS. 5A and 5B show the Multiple Washer Lap Wound Armature Electric Motor (alternate embodiment #IV). The construction of the Multiple Washer Lap Wound Motor is basically the same as the Nail Motor and Tee Wedge Motor except that the nail armature pole pieces of the Nail Motor have been replaced by a stack of iron or steel washers bounded by single notched end plates. Except for the location of individual notches on the end plates, the construction of the Multiple Washer Lap Wound Armature motor is the same as the Multiple Washer Coil on Cord motor, (Embodiment #III). FIG. 5C shows the individual notch location for the Multiple Washer Lap Wound Armature motor, (embodiment #IV). The end plates, FIG. 5B part 25, can be made from any relatively stiff non metallic material. Waxed milk carton material has been used successfully for the notched end plates. The purpose of the notches is to position and hold the armature magnetic wire in place. For the Multiple Washer Lap Wound motor, the number of notches is equal to the number of commutator segments and this is always an even number. The motor is then wound as shown in FIG. 5C being careful to lay the magnetic wire coils flat along the length of the multiple washer stack. This winding is the standard "lap" winding used in commercial direct current motors. Because this winding places coils around the diameter of the multiple washer stack, space is needed at the end of the stack to accommodate overlapping coils. In the design under this invention, this space is provided by a short piece of non metallic tubing shown as part 23 on FIG. 5B. Polyethylene tubing has been used successfully for this spacer. Before winding the armature core, individual notches are aligned with each other and with the spaces between segments of the commutator. The multiple washer stack is then secured by tightening the pole nuts part 9.

While the main embodiment and embodiments #I, #II and #III are excellent for instructional purposes and for providing power to model projects, only embodiment #IV teaches commercial motor construction. The armature core of embodiment #IV is very easy to make. Only the notched end plates need to be fabricated and this is easily accomplished with a compass and a pair of scissors. Any of the commutator arrangements, described below, will work successfully with the lap wound armature core of embodiment #IV. The electric motor of embodiment #IV runs very smoothly and has excellent starting and reversing characteristics. Unfortunately the lap winding can be confusing to younger children and therefore construction of embodiment #IV is reserved for older high-school students.

DESCRIPTION—DRILLED SEGMENT PRESSURE CONTACT COMMUTATOR—ALTERNATE EMBODIMENT #V (FIG. 6)

FIG. 6 shows the assembly view and wiring details of the Drilled Segment Pressure Contact Commutator (alternate embodiment #V) which can be used with all motors of this invention. The advantage of the drilled segment commutator is that much smaller commutators can be built and the plastic washer of the main embodiment commutator is eliminated. Smaller commutators are important for very low voltages, (less then 1.5 volts), because at these low voltages, drag by the brushes on the armature commutator can be a significant percentage of the total motor torque. The smaller commutator produces much less brush drag and therefore better motor operation. For motors of more then 3 armature poles and higher voltage operation, the main embodiment commutator or the wire wrap disk commutator described below are preferred.

The drilled segment pressure contact commutator is made by first wrapping, at a predetermined location, one or two layers of electric insulating tape around the threaded motor shaft between non metallic commutator washers, part 5; metallic commutator washers, part 7; and commutator compression nuts, part 11. Next, one or two layers of a narrower strip of electric tape are wrapped around the first wider layers of electric tape to form a "stepped" structure as shown in FIG. 6 part 27. Next one layer of double sided mastic tape is wrapped round the narrower strip of electric tape (see FIG. 6 part 21). This tape is used to temporarily hold the commutator segments in position while tightening the commutator compression nuts, part 11. Following the mastic tape installation, a piece of small diameter metallic tubing of the correct inside diameter to match the outside diameter of the narrow electric tape is cut to a length equal to the width of the wider electric tape. This piece of tubing is then cut length wise to give the correct number of equal width commutator segments. Next, a small hole is drilled at one end of each segment. After placing pole piece magnetic wire loops, which have been locally stripped of their varnish insulation, through the small holes in the commutator segments, as shown in FIG. 6, and then placing the commutator segments on the double sided mastic tape, the commutator compression nuts are tightened. Note: before placing the commutator segments on the mastic tape and before tightening the commutator compression nuts, all commutator segments must be threaded with stripped magnetic wire loops as shown in FIG. 6A. Tightening the commutator compression nuts, part 11, causes non metallic commutator washers, part 5, and metallic washers, part 7, to squeeze all the commutator segments. The insulation stripped pole piece magnetic wire loops, which have been threaded through the holes in the commutator segments, are then pinched between the ends of the commutator segments and one of the non metallic washers. The commutator is now functional with positive pressure contact between the stripped magnetic wire and the end of the commutator segments.

DESCRIPTION—WIRE WRAP DISK COMMUTATOR—ALTERNATE EMBODIMENT #VI (FIG. 7)

FIG. 7 shows the assembly view and wiring details of the "Wire Wrap Disk Commutator" (alternate embodiment #VI) which can be used with all motors of this invention. The advantage of the wire wrap disk commutator is that it is very easy to construct because no non metallic, metallic or plastic washers are required, no metallic tubing or electric insulating tape or double sided mastic tape are required and no metallic commutator segments or method for wire attachments to metallic commutator segments are required. The pole piece magnetic wires themselves form continuous commutator tracks for wide sheet metal brushes to follow. The wire wrap disk commutator is ideal for class room construction because no careful metal cutting, drilling or filing are required. The more armature poles that are built into the motor, the better the wire wrap disk commutator works because the more circular the wire tracking becomes. The wire wrap disk commutator is therefore ideal for embodiment #IV because of the many commutator segments required for embodiment #IV. The wire wrap disk commutator of this invention, when coupled with the pole piece embodiments of this invention, will provide smooth running motors.

To construct a wire wrap disk commutator, a non metallic disk is obtained (see FIG. 7 part 28). Hobby stores sell small plain wooden disks intended for use as wheels. If carefully done, disks can also be cut from wooden dowels. Other materials such as heavy plastic sheet can also be used to fabricate disks. After obtaining a suitable disk, a hole slightly larger then the diameter of the threaded rod motor shaft is drilled into the center of the disk. For 5 pole piece armatures, at least 5 equally spaced notches are then cut into the outer rim of the disk as shown in FIG. 7B. The size of the notches in FIG. 7B are exaggerated for clarity. For armatures of 5 or more poles, only one notch is cut for each pole. The disk is then placed on the motor shaft and secured by tightening the commutator compression nuts, part 11 of FIG. 7. Notches must be lined up with the armature pole pieces. Pole pieces are then wound as shown in FIG. 7B. After sanding the face of the disk to remove magnetic wire insulation and constructing metallic brushes from thin sheet metal as shown in FIG. 7 part 29, the wire wrap disk commutator becomes fully operational.

DESCRIPTION—FLATTENED WIRE COMMUTATOR—ALTERNATE EMBODIMENT #VII (FIG. 8)

The flattened wire commutator is shown in FIG. 8A. The commutator is made from short pieces of bare metallic wire, part 30; a piece of stiff non metallic tubing of small diameter such as polyethylene tubing, part 4; double sided mastic tape, part 21; insulating electric tape, part 20; non metallic commutator washers, part 5; metallic commutator washers, part 7; and commutator compression nut(s), part 11. The commutator segments are made by first flattening then contouring to a circular shape ½ of the bare metallic wire for a length slightly less than the length of the non metallic tubing. A 90 degree bend is then made where the flattened and contoured part begins. After making the required number of commutator segments, the piece of non metallic tubing is given one wrap of double sided mastic tape. The flattened and contoured part of the commutator segments are then placed in the correct position on the mastic tape (see FIG. 8B). Next, the round leg of the segments are tack glued to part 5 and the ends of the commutator segments are wrapped with narrow strips of electric tape, part 20 of FIG. 8, to secure the commutator segments to the mastic tape. With one commutator compression nut, part 11, and one metallic washers, part 7, in place, the commutator is slipped on the threaded motor shaft making sure the round extensions of the flattened wire segments line up with the midpoint between motor pole pieces. The other non metallic and metallic washers and commutator compression nut are then installed and finally the commutator compression nuts are tightened. The commutator is now secure and functional and can be connected to the armature pole piece windings as shown in FIG. 8.

The flattened wire commutator has the advantage that it is easy to construct and lends itself to very small diameter compact commutators.

DESCRIPTION—POST AND TUBE MOTOR BEARING INSTALLATION AND MOTOR FRAME FOR ALL EMBODIMENTS (FIG. 9)

FIG. 9 shows the post and tube motor bearing installation and motor frame which can be used with all motor embodiments of this invention. Construction of the frame for the post and tube motor bearing installation is initiated by first attaching posts, part 31, to the motor base, part 33, by some means. One method which has been used successfully for attaching the posts to the motor bases is to drill holes in the motor base to receive posts made from wood, plastic or metal. Following attachment of the posts to the motor base the motor bearings, which are made from short lengths of metallic tubing, are placed on the threaded motor shaft on either side of the armature (see FIG. 9 parts 32). The bearings, part 32, are then attached by some means such as hot glue or epoxy to the top of the posts, part 31. Soldering of metallic tube bearings to metallic posts is possible but not recommended due to the hazards to children involved. The motor frame is then completed by mounting field magnets, part 13, to the tops of similar posts using the post and glue method followed by fastening paper clip or wire motor brushes, part 14, to the motor base with terminal screws, part 15. Sheet metal brushes can also be installed on the motor base on either side of the commutator bearing post as shown in FIG. 7. The field magnets for Alternate Embodiment IV are mounted vertically using the post and beam system shown in FIG. 9A.

The advantage of using short pieces of metallic tubing for motor bearings is that the tendency for the threaded motor shaft to creep in the bearing is eliminated due to the wide bearing surface. If the posts are installed with a small drill press, a well aligned installation will result.

FIELD MAGNET ARRANGEMENTS—ALL EMBODIMENTS

Figure 10A:
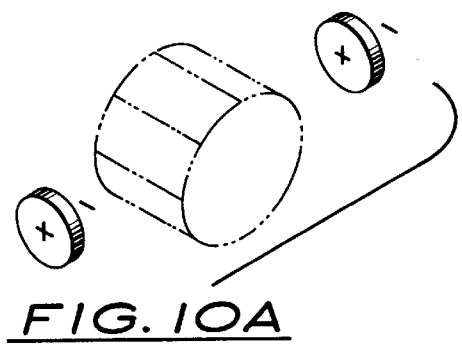
Figure 10B:
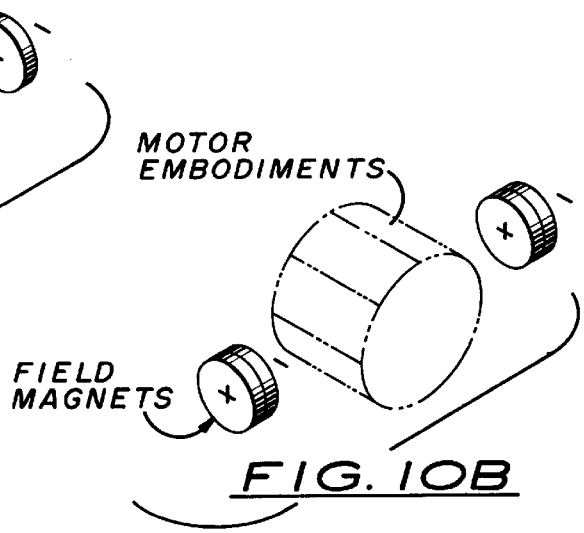
Figure 10C:
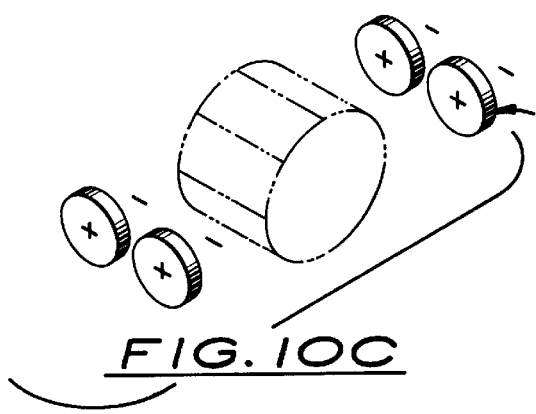
Figure 10D:
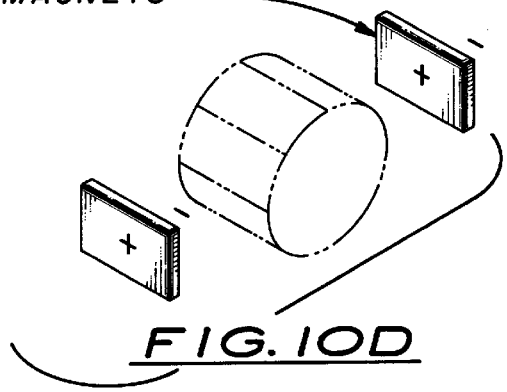
Figure 10E:
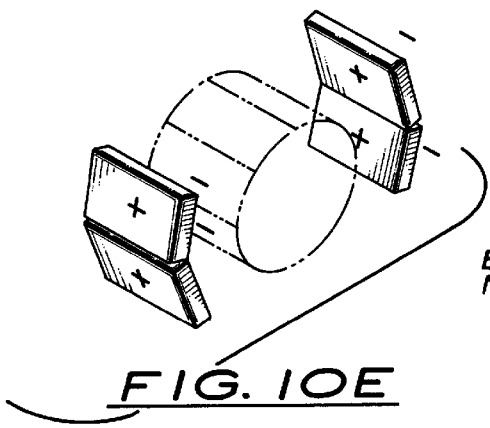

FIGS. 10A through 10F show various ways the field magnets can be arranged for any of the embodiments of this invention. For example by doubling field magnets as shown in FIG. 10B, field strength is doubled which intern doubles motor power. By replacing the permanent magnets with electromagnets, alternating (AC) current motor operation is achieved (see FIG. 10F).

MOTOR KIT AND INSTRUCTION BOOKLET—ALL EMBODIMENTS

The nail electric motor and all of its embodiments included in this disclosure would be assembled in kit form with parts being furnished either as raw material or precut and/or predrilled. The kit would include instructions for construction of one or more of the embodiments and for construction of motorized model cars, trucks, cranes, airplanes and boats.

OPERATION—EMBODIMENTS

With the motor shaft extensions being threaded rod, it is very easy for students to attach various devices, such as pulleys, gears and propellers, to the shaft. Using tubing pieces, motor shaft extensions can easily be made.

The motor armatures do not necessarily require a housing. The model project itself becomes the housing. For example, if the student is building a crane, holes can be made in the crane walls for motor shaft bearings, part 32. Magnets and brushes are then appropriately mounted, at the students discretion, within the crane. Once mounted, a low voltage DC source such as batteries or transformer/rectifier power supply is connected to the terminals part 15. Voltages between 3 and 12 volts are recommended although all motor embodiments of this invention work very well at 1.5 volts with any of the commutator configurations of this invention. Motor reversal is accomplished with a simple double pole double throw switch connected between the power source and the motor terminals.

The poles of an individual motor, regardless of the embodiment, are all wound in the same direction. That is, all poles of an individual motor are wound either clockwise or counter clockwise when viewed from the outer end of the pole. The same is also true for embodiment #III and #IV wherein clockwise or counter-clockwise winding must be maintained when winding around the multiple washer stack cord or diameter. For all embodiments, once electric power is connected to terminals 15, torque is produced because electrons have two paths, through the armature, that they may follow when going from the positive to the negative terminal. One path causes electrons to flow clockwise around the poles of the upper half of the armature while the other path causes electrons to flow counterclockwise around the poles of the lower half of the armature. This causes the top half of the motor armature to have positive polarity while the bottom half is negative polarity. Thus an armature magnetic field angled at 90 degrees to the field magnetism is produced and a turning torque is the result.

Figure 10F:
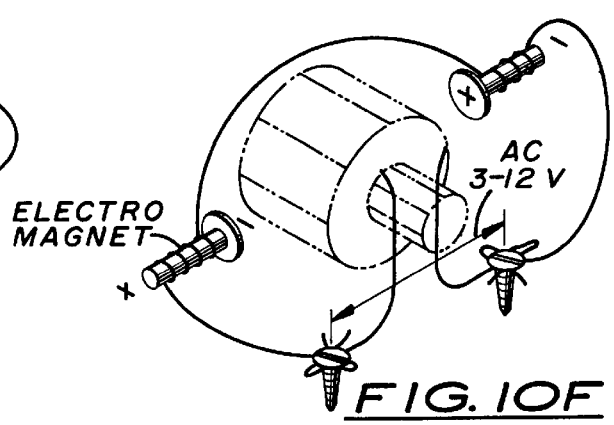

The motors of all embodiments are easily converted to AC operation by simply replacing the permanent field magnets with simple "nail or bolt" electromagnets as shown in FIG. 10F. The reason why the motors now work on AC current is that polarity of the armature halves switches in unison with the field electromagnets. Thus magnetic fields at 90 degrees to each other are maintained even though the polarity of the fields is constantly changing. Reversal of the AC motor is accomplished by reversing field winding connections at terminals 15 the same as with the DC motor operation. With AC operation, voltages between 3 and 12 volts are also recommended.

SUMMARY, RAMIFICATIONS, AND SCOPE

The electric motors shown in all embodiments of this invention and the commutator configurations of this invention are not only fun to build but provide a great teaching aid in the study of electricity and magnetism. In conjunction with an oscilloscope, students can visually see why different electric power supplies require different motor configurations. The oscilloscope also provides visual evidence of electric power production when any of the embodiments are spun to generate electricity. Alternate embodiment #I makes the best generator.

The motors of the embodiments can be easily constructed in a classroom setting, at very low cost, with no special tools or special material requirements. Because of the low voltage operating requirements, no soldering requirements and no need for power tools, except for alternate embodiment #II which usually requires a drill press, construction is essentially non hazardous. Because of the use of hand saws, hobby knives and hot glue guns, construction of these motor embodiments is not recommended for children younger then 11 years of age. Even with the use of hand tools, safety glasses should be worn during construction of motor parts.

Although the description above contains many specifications, these should not be construed as limiting the scope of the invention but as merely providing illustrations of some of the presently preferred embodiments of this invention. For example, any of the embodiments may be mounted on a wide variety of base materials such as wood, card board, Styrofoam, heavy plastic or metal and motor shafts may be of any length required to fit into bodies of model cranes, cars, trucks, boats and planes. The walls of such models can be used as the bearing supports for the motor shaft. Brushes, which are usually made from wire or paper clips or thin sheet metal, can either be secured to a motor base or to the sides of the models described above.

It is also important to note that embodiments related to pole piece construction can be combined with embodiments related to the commutator construction. Thus, as many as 20 different final motor configurations are possible.

Therefore, the scope of the invention should be determined by the appended claims and their legal equivalents, rather than by the examples given for the motors materials of construction, final use or final appearance.

I claim:

1. A low voltage nail electric motor used for motivational teaching comprising: a nail electric motor armature and a motor base wherein the bearings for the armature shaft of said nail electric motor are attached to the tops of bearing support posts which protrude vertically upward from said motor base and where the armature of said electric motor turns in a magnetic field created by button type permanent field magnets affixed to support posts which are attached to the motor base and where power to the disk commutator of said nail electric motor is supplied through terminal screws and sheet metal brushes attached to said motor base and where the armature of said electric motor consists of an armature shaft made from an unaltered length of threaded rod where said shaft includes and passes in succession through: a bearing made from a short piece of round metallic tubing, a length of spacer tubing to correctly position the armature pole pieces between the button field magnets, an armature pole nut which secures and holds nail pole pieces in position on said armature shaft, a pair of metallic pole washer which provide support for the nail pole pieces of said nail electric motor, a second armature pole nut which serves the same purpose as the first; a commutator compression nut to hold a disk commutator in position on the armature shaft, a non-metallic disk commutator with equally spaced notches on its rim where said notches are equal in number to the number of nail pole pieces of said nail motor and where the purpose of said notches is to receive pole piece magnetic wire, a second commutator compression nut which serves the same purpose as the first; a second length of spacer tubing which serves the same purpose as the first, a second bearing constructed the same as the first; a set of five or more nail armature pole pieces made from common nails the bodies of which nails are sandwiched between said nail motor metallic pole washers where said nail pole pieces are all of the same length and are uniformly spaced and arranged to project radially outward from the nail motor armature shaft to form a star like configuration around the armature shaft and wherein, after initial tacking with hot glue, the bodies of said nails are securely clamped between the metallic pole washers by the armature pole nuts; a commutator assemblage procedure whereby the commutator of said nail electric motor is secured by tightening the disk commutator compression nuts while disk commutator notches are vertically aligned with the nail bodies; magnetic wire of sufficient length to form electromagnetic coils around each nail body; a magnetic wire winding procedure whereby armature poles are formed by winding magnetic wire around each nail pole piece where all nail pole pieces are wound sequentially either clockwise or counterclockwise with the magnetic wire from each pole piece going to said disk commutator before succeeding nail pole pieces are wound and where said magnetic wire, upon arriving at said disk commutator, is woven around two adjacent rim notches on said disk commutator to form a commutator segment on the face of said disk commutator and where said winding then proceeds until all nail pole pieces are wound and all necessary commutator segments have been formed on the face of said disk commutator and where said nail motor is then made operational by removing the insulating magnetic wire coating from the face of the disk commutator so that positive electric contact can be made with the two flexible sheet metal brushes which are attached to said motor base; operational principle whereby turning of said armature shaft of said nail electric motor is achieved by applying a direct current voltage source to the sheet metal brushes located on said motor base causing an electric current to flow from the negative brush to the positive brush through the disk commutator and the coils of the nail pole pieces with the resulting effect that one half of said current flows in one direction around the upper nail pole pieces while the other half of said current flows around the lower nail pole pieces in the opposite direction causing the upper electromagnetic nail pole pieces to take on a polarity opposite the lower nail electromagnetic pole pieces thus creating an overall armature electromagnetic field oriented ninety degrees to the permanent magnetic field being generated by the field permanent magnets and where, because of the alignment of the spaces between wire commutator segments and the nail pole pieces, the rotating nail electromagnets become demagnetized as they approach the field magnets.

2. The nail electric motor of claim 1, further to include a nail electric motor base where said base accommodates said nail motor assembled armature by having the tubular bearings of said armature glued or cemented to the tops of bearing support posts which protrude vertically upward from said motor base and wherein said motor base is made from wood or other non electrically conducting material and wherein said base is drilled with four holes the placement of which are at the extremities of a Latin cross drawn on the base and where said holes are made to accommodate four removable posts; two bearing support posts located in the motor base holes which are at the extremities of the long leg of said cross; two field magnet support posts which are located in the holes at the extremities of the short arm of said cross; two each button type permanent field magnets cemented or glued one each to the upper sides of said field magnet support posts wherein the center of said button permanent magnets are at the same height as the center line of said armature shaft and where said button magnets face each other horizontally in a plus to minus orientation to provide a horizontal magnetic field perpendicular to the armature shaft; two flexible sheet metal brushes used with the disk commutator of said nail electric motor wherein said sheet metal brushes are long narrow rectangles attached to the motor base with terminal screws which pass through a centrally located hole at one end of the brushes and where said sheet metal brushes are then made to sweep upward to make contact on each side of the armature shaft with the face of the disk commutator of said nail electric motor wherein the purpose of said brushes is to provide electric power to the rotating disk commutator; two terminal screws the purpose for which are to provide a connection for electric power to the nail motor and to secure one end of each of said sheet metal brushes to the motor base.

3. The educational electric motor kit of claim 1, further including a multiple washer lap wound electric motor armature designed to fit the universal motor base of said kit wherein the armature shaft of said lap wound motor is an unaltered length of threaded rod wherein said rod includes and passes in succession through: an armature pole nut for securing and holding the lap wound motor poles in position on said armature shaft, a stiff non metallic tube spacer to electrically insulate and hold armature coils away from said armature shaft, a large diameter notched non metallic endplate with rectangular notches punched or cut on the outer perimeter to hold lap wound coil wraps in position wherein the quantity of said notches on said end plate is an even number greater than four and wherein said notches are spaced evenly around the perimeter of said non metallic washer, one or more large diameter iron or steel washers to form a washer stack wherein said stack constitutes the pole core around which coils are wrapped wherein the washers of said washer stack have an outside diameter equal to about 70% of the diameter of said non-metalic end-plates, a second non metallic washer constructed the same as the first endplate and serving the same purpose as the first end-plate, a second non metallic tube spacer serving the same purpose as the first, a second armature pole nut serving the same purpose as the first, a commutator compression nut to hold commutator parts in position on the armature shaft, a metallic commutator washer to provide end support to the commutator assemblage, a non metallic washer to electrically insulate commutator segment ends from the armature shaft, a length of small outside diameter non metallic tubing to form a substratum for the commutator segments, a second non metallic commutator washer serving the same purpose as the first, a second non metallic commutator washer serving the the same purpose as the first, a second commutator compression nut serving the same purpose as the first; an armature pole assemblage procedure whereby the armature core of said lap wound electric motor is secured by tightening said pole nuts while the notches on said endplates are horizontally aligned with each other; a set of flattened wire commutator segments for the lap wound electric motor wherein the number of said segments is equal to the number of notches in said armature pole end-plates of said lap wound motor and where said segments resemble the capital letter L with one leg of said L having a circular cross section and the other leg having a flattened and contoured cross section; commutator assemblage whereby the commutator for the lap wound motor has flattened wire commutator segments placed uniformly around said small diameter non metallic tubing substratum with the flattened and contoured side of said segments affixed with double sided tape or adhesive cement to said substrate and with the round leg of said flattened wire commutator segment affixed with hot glue or cement to the vertical face of the pole side nonmetallic commutator washer with the gap between flattened wire segments being aligned with the centerline of said end-plate rectangular notches and wherein said flattened wire segments are held firmly in place by a single narrow wrap of electric tape on the bearing side of the commutator wherein said wrap completely encircles the commutator with a horizontal space being left between the wrap and the pole side non-metallic washer for contact by the wire brushes of said universal motor base; a roll of magnetic wire of sufficient length to form electromagnetic coils around the armature washer stack wherein said coils are held in position by being wound through diametrically opposed notches on the face of the end-plates with all of said coil being wrapped sequentially either clockwise or counterclockwise around the stack and wherein positive electric contact is made between the magnetic wire from each lap coil and the round leg of each flattened wire commutator segment before succeeding coils are wrapped.

4. An educational electric motor kit for motivational teaching comprising: parts for assemblage of armatures for a nail electric motor with cylindrical segment pressure contact commutator, a tee wedge electric motor with flattened wire commutator, a fender washer electric motor with a drilled segment pressure contact commutator and a multiple washer lap wound electric motor with a flattened wire commutator wherein said parts for said motors of said kit include: a set of nail pole pieces, a set of tee wedge armature pole pieces, a pair of drilled fender washer pole pieces, and a set of common washer pole pieces for the lap wound motor wherein all pole pieces are included to form rotating electromagnets, a threaded armature shaft for each of said motors complete with pole nuts and metallic pole washers to hold armature pole pieces in position, a set of cylindrical commutator segments ,two sets of flattened wire commutator segments and a set of drilled segment commutator segments to provide switching for rotating nail, tee wedge, fender and lap wound electromagnet pole pieces, commutator compression nuts and metallic and non metallic commutator washers to hold commutator segments in position, non-metallic tubing to form a substratum for cylindrical and flattened wire commutator segments, a roll of electric insulating tape to form the substratum for the drilled segment commutator and segment holding wrap for the flattened wire commutator, a spool of magnetic wire of sufficient length to wind the poles of the nail, tee wedge, fender washer, and lap wound motors, pole winding instructions for said motors; parts for assemblage of a universal motor base wherein said base is able to accommodate the armatures of the nail, tee wedge, fender washer, and lap wound motors by virtue of having in common a pair of bearings attached to two removable bearing support posts located on said universal motor base so that either the nail motor, tee wedge, fender washer, or lap wound motor can be tested individually by removing said bearing support posts with attached bearings from said motor base and placing said bearings on each end of the armature shaft of the selected test motor before reattachment of said bearing support posts to the universal motor base and wherein said parts list for said universal motor base includes: a pair of tubular bearings attached to removable bearing support posts where said bearings fit the armature shaft of the nail, tee wedge, fender washer and lap wound electric motors; a pair of button type permanent field magnets attached to removable permanent magnet support posts where the purpose of said permanent magnets is to create a unidirectional magnetic field perpendicular to the armature electromagnetic field; a pair of nail type field electromagnets attached to removable electromagnet support posts where said electromagnet support posts are interchangeable with the permanent field magnet support posts and where the purpose of said nail type field electromagnets is to convert said direct current motors to alternating current motors; a pair of wire brushes to make electrical contact with the sides of commutators for the nail, tee wedge, fender washer, and lap wound motors; two terminal screws to attach wire brushes to the universal motor base; an armature core magnetic wire winding procedures whereby all pole pieces of said motors are wound either clockwise or counterclockwise and where positive electric contact is made between magnetic wire from each pole piece and each commutator segment before succeeding pole pieces are wound; a direct current operational principle whereby turning of the armature shaft of said nail and tee wedge direct current motors is achieved by applying a direct current voltage source to brushes located on said universal motor base causing a direct electric current to flow from the negative brush to the positive brush through the commutator and the coils of pole pieces with the resulting effect that one half of said current flows in one direction around the upper pole pieces while the other half of said current flows around the lower pole pieces in the opposite direction causing the upper electromagnetic pole pieces to take on a polarity opposite the lower electromagnetic pole pieces thus creating an overall armature electromagnetic field oriented ninety degrees to the magnetic field being generated by the field permanent magnets; an alternating current operating principle whereby series connected field electromagnets are in parallel with motor brushes causing field and armature magnetic polarities to shift in unison when said brushes are connected to an alternating current source.

5. The educational electric motor kit of claim 4, further including a universal motor base made from wood or other non-electrically conducting material wherein said base is predrilled with four holes the placement of which are at the extremities of a Latin cross drawn on the base wherein said holes are made to accommodate four posts; six removable posts of approximately the same length which are designed to fit snuggly in said holes of the motor base wherein two of said posts are to support motor shaft bearings, two are to support button type permanent field magnets and two are to support nail type field electromagnets; two inline armature shaft bearings, which are to be used with the nail, tee wedge, fender washer and lap wound motors, where said bearings are made from short lengths of metallic tubing and wherein said bearings are cemented or glued horizontally one each to the tops of the support posts that are located at the extremities of the long leg of said cross on said universal base; two each button type permanent field magnets to be used with the nail, tee wedge, fender washer and lap wound motors where said button magnets are to be cemented or glued one each to the upper sides of the posts that are located in the holes at the extremities of the short arm of the cross and wherein the center of said button permanent magnets are to be set at the same height as the armature shaft bearings and where said button magnets are made to face each other in a plus to minus orientation when their supporting posts are placed in said holes; two field electromagnets made from nails coiled with magnetic wire wherein said electromagnets are glued or cemented one each to the tops of electromagnet support posts wherein said electromagnet support posts are interchangeable with the permanent magnet support posts located on said universal motor base and wherein said electromagnets are wound one clockwise and the other counterclockwise so that when said electromagnets are connected in series, the heads of said electromagnets face each other in a plus to minus orientation and wherein the center of the heads of said electromagnets are to be set at the same height as the armature shaft bearings of said universal motor base; two thin but stiff wire brushes which make contact with the sides of commutators of the nail, tee wedge and fender washer electric motors wherein the purpose of said brushes is to provide electric power to the rotating commutator; two terminal screws the purpose for which are to provide a connection for electric power to said motors and to secure one end of each of said brushes to the universal motor base.

6. The educational electric motor kit of claim 4, further including a nail electric motor armature designed to fit said universal motor base wherein the armature shaft of said nail electric motor is an unaltered length of threaded rod wherein said shaft includes and passes in succession through: a short length of spacer tubing to correctly position the armature pole pieces between field magnets, an armature pole nut for securing and holding nail pole pieces in position on said armature shaft, a pair of metallic pole washer which provides support for the nail pole pieces, a second pole nut which serves the same purpose as the first, a commutator compression nut to hold commutator parts in position on the armature shaft, a metallic commutator washer to provide end support to the commutator assemblage, a non-metallic commutator washer to electrically insulate magnetic wire from the armature shaft, a plastic washer with holes uniformly spaced on a concentric circle for positioning magnetic wire loops between commutator segments and said plastic washer, a length of non-metallic tubing to form a substratum for commutator segments, a second non-metallic commutator washer to electrically insulate the ends of commutator segments from the armature shaft, a second metallic commutator washer which serves the same purpose as the first, a second commutator compression nut which serves the same purpose as the first; a second short length of spacer tubing which serves the same purpose as the first, a set of five or more nail armature pole pieces made from common nails the bodies of which nails are to be sandwiched between said nail motor metallic pole washers wherein said nail pole pieces are to be uniformly spaced and arranged to project radially outward from the nail motor armature shaft to form a star like configuration around the armature shaft and wherein, after initial tacking with hot glue, said nail bodies are to be securely clamped between the metallic pole washers by said nail motor armature pole nuts; a set of commutator segments made from cylindrical metallic tubing where said segments are to be uniformly affixed, with double sided tape or adhesive cement to the top surface of said nail motor non-metallic tubing substratum wherein the number of metallic tube segments comprising said set is equal to the number of nail pole pieces and wherein the positioning of said commutator segments on said nail motor non-metallic tubing shall be such that the space between commutator segments line up with each nail pole piece and wherein said commutator segments are to be held firmly in place by clamping them between said plastic washer and non-metallic commutator washer using said nail motor commutator compression nuts; a roll of magnetic wire of sufficient length to form electromagnetic coils around each nail pole piece of said nail electric motor wherein each nail pole piece shall be wound sequentially with all of said nail pole pieces wound either clockwise or counterclockwise and where, between poles, positive electrical contact is made between pole piece magnetic wire and metallic commutator segments by hooking coating stripped magnetic wire loops through the positioning holes in said plastic washer causing the tips of said loops to become pinched between the commutator segments and the plastic washer when commutator compression nuts are tightened.

7. The educational electric motor kit of claim 4, further including a tee wedge electric motor armature designed to fit the universal motor base of said kit wherein the armature shaft of said tee wedge electric motor is an unaltered length of threaded rod where said shaft includes and passes in succession through: an armature pole nut for securing and holding tee wedge pole pieces in position on said armature shaft, a pair of metallic pole washer which provides support for the tee wedge pole pieces, a second pole nut which serves the same purpose as the first, a commutator compression nut to hold commutator parts in position on the armature shaft, a metallic commutator washer to provide end support to the commutator assemblage, a non-metallic commutator washer to electric insulate the ends of commutator segments from the armature shaft, a length of small outside diameter non-metallic tubing to form a substratum for commutator segments, a second non-metallic commutator washer which serves the same purpose as the first, a second metallic commutator washer which serves the same purpose as the first, a second commutator compression nut which serves the same purpose as the first; a set of five or more tee wedge armature pole pieces fabricated from iron or steel bar stock wherein each pole piece resembles a wide body capital letter T which is flat and narrow in thickness and wherein the bodies of said tee wedge pole pieces are sandwiched, end to end, between said tee wedge motor metallic pole washers and wherein said tee wedge pole pieces are to be uniformly spaced and positioned so that they project radially outward from the tee wedge motor armature shaft to form a star like configuration around said armature shaft and wherein, after initial tacking with hot glue, said tee wedge pole piece bodies are securely clamped, end to end, between said tee wedge motor metallic pole washers by tightening said tee wedge motor pole nuts; a set of flattened wire commutator segments for the tee wedge electric motor where the number of said segments is equal to the number of tee wedge pole pieces wherein said segments resemble the capital letter L with one leg of said L having a circular cross section and the other leg having a flattened and contoured cross section; commutator assemblage whereby the commutator for the tee wedge electric motor has the flat contoured legs of the flattened wire commutator segments placed uniformly around said small diameter non-metallic tubing with the flattened and contoured side of said segments affixed with double sided tape or adhesive cement to said small diameter non metallic tubing and with the round leg of said flattened wire commutator segment affixed with hot glue or cement to the vertical face of the pole side non-metallic commutator washer with the gap between flattened wire segments being aligned with the tee wedge pole pieces and wherein said flattened wire segments are held firmly in place by a single narrow wrap of electric tape on the bearing side of the commutator and wherein said wrap completely encircles the commutator with a horizontal space being left between the wrap and the pole side non-metallic washer for contact by the wire brushes of said universal motor base; a roll of magnetic wire of sufficient length to form electromagnetic coils around each tee wedge pole piece of said tee wedge electric motor wherein all tee wedge pole pieces shall be wound sequentially with all of said tee wedge pole pieces wound either clockwise or counterclockwise and where positive electrical contact shall be made between the magnetic wire and the round leg of each flattened wire commutator segment before succeeding tee wedge pole pieces are wound wherein said positive contact shall be achieved by first stripping the insulating coating from the magnetic pole piece wire before wrapping said wire around the outwardly protruding round leg of the flattened wire commutator segment and wherein said wraps are secured in place by folding the tops of said round portion of the flattened wire commutator segments over said wraps.

8. The educational electric motor kit of claim 4, further including a fender washer electric motor armature designed to fit the universal motor base of said kit wherein the armature shaft of said fender washer electric motor is an unaltered length of threaded rod where said shaft includes and passes in succession through: a length of spacer tubing to correctly position the fender washer armature pole pieces between field magnets, an armature pole nut for securing and holding fender washer pole pieces in position on said armature shaft, a metallic pole washer to hold fender washer pole pieces rigidly in position on the armature shaft, a set of one or more large diameter fender washers where said large diameter fender washers shall have been predrilled with three or more large holes which are uniformly spaced on a concentric circle around the center of said fender washers and wherein said large holes are separated by radial saw cuts on the perimeter of said fender washers wherein the purpose of said saw cuts are to first separate fender washer pole pieces and second to allow entrance of magnetic wire for wrapping around the solid metal portion between the large holes in said fender washer to form pole piece electromagnets and wherein said fender washers are to be held firmly in place by tightening the pole nuts, a second metallic pole washer which serves the same purpose as the first, a second pole nut which serves the same purpose as the first, a commutator compression nut to hold commutator parts in position on the armature shaft, a metallic commutator washer to provide end support to the commutator assemblage, a non metallic commutator washer to electric insulate the ends of commutator segments from the armature shaft, a wrapping of electric tape to form a substratum for commutator segments, a second non metallic commutator washer which serves the same purpose as the first, a second metallic commutator washer which serves the same purpose as the first, a second commutator compression nut which serves the same purpose as the first; a set of drilled commutator segments made from metallic cylindrical tubing wherein said segments have a small hole drilled at one end of the segments to receive and position pre stripped magnetic wire loops from said fender washer pole pieces and wherein the number of said drilled commutator segments is equal to the number of fender washer poles and wherein said segments are to be uniformly affixed with double sided tape or adhesive cement to the top surface of said electric tape wrapping on said fender washer armature shaft and where positioning of said drilled segments on said electric tape wrapping is such that the space between drilled segments lines up with each fender washer pole piece and wherein said drilled commutator segments for said fender washer motor are held firmly in place by clamping them between said non metallic commutator washers using the fender washer commutator compression nuts; a roll of magnetic wire of sufficient length to form electromagnetic coils around each fender washer pole piece wherein each fender washer pole piece shall be wound sequentially with all of said pole pieces wound either clockwise or counterclockwise and wherein positive electrical contact is to be made between the magnetic wire and each fender washer commutator segment before succeeding fender washer pole pieces are wound and wherein said positive contact is made by hooking pre-stripped magnetic wire from the pole pieces through the small hole on the end of the commutator segment before securing commutator segments with the commutator compression nuts.

* * * * *